United States Patent [19]

Mosser et al.

[11] Patent Number: 4,610,929
[45] Date of Patent: Sep. 9, 1986

[54] PARTS COATED WITH PRIMER COATING COMPOSITION

[75] Inventors: Mark F. Mosser, Sellersville; William J. Fabiny, Harleysville, both of Pa.

[73] Assignee: Sermatech International, Inc., Limerick, Pa.

[21] Appl. No.: 728,791

[22] Filed: Apr. 30, 1985

Related U.S. Application Data

[62] Division of Ser. No. 555,457, Nov. 28, 1983, Pat. No. 4,532,289.

[51] Int. Cl.$^4$ .............................................. B32B 27/00
[52] U.S. Cl. ...................................... 428/421; 428/461; 428/704; 427/421
[58] Field of Search ................ 428/421, 461, 704; 427/421

[56] References Cited

U.S. PATENT DOCUMENTS

| | | | |
|---|---|---|---|
| 3,248,251 | 4/1966 | Allen | 428/450 |
| 3,352,814 | 11/1967 | Collins, Jr. et al. | 524/406 |
| 3,785,854 | 1/1974 | Baldi | 148/6.16 |
| 3,798,074 | 3/1974 | Esler et al. | 148/6.16 |
| 4,411,950 | 10/1983 | Smith | 428/461 |

FOREIGN PATENT DOCUMENTS

| | | | |
|---|---|---|---|
| 0075908 | 4/1983 | European Pat. Off. | 524/406 |
| 59-133374 | 7/1984 | Japan | 428/461 |
| 59-162278 | 9/1984 | Japan | 428/461 |

Primary Examiner—Joseph L. Schofer
Assistant Examiner—N. Sarofim
Attorney, Agent, or Firm—Weiser & Stapler

[57] ABSTRACT

A primer coating composition, particularly for use with polyvinylidene fluoride topcoating comprising an aqueous acid coating composition having phosphate ions and ions of the group of chromate ions or molybdate ions, and particulate of polyvinylidene fluoride.

32 Claims, No Drawings

PARTS COATED WITH PRIMER COATING COMPOSITION

This application is a division of application Ser. No. 555,457, filed Nov. 28, 1983, now U.S. Pat. No. 4,532,289.

The invention relates to a primer coating composition comprising polyvinylidene fluoride and a phosphate composition, and with articles of manufacture so coated to obtain improved adhesion between the substrate and a polyvinylidene fluoride topcoat. The invention further relates to laminates formed on a substrate with a polyvinylidene fluoride topcoat composition.

There is widespread demand in industry for protective coatings which will withstand the effects of severe environmental conditions. Many protective coatings are currently available but have limited solvent resistance and/or weathering characteristics, i.e. polyesters, arcylics, epoxies. Polyvinylidene fluoride has a unique combination of physical and chemical characteristics which has led to its use in a variety of coating applications. Physically, this polymer, which is flexible at low temperatures, possesses high thermal stability. Chemically, this polymer offers excellent resistance to salt spray, humidity, solvents and stains. As compared with conventional coating polymers, polyvinylidene fluoride has exhibited better color longevity and weathering properties on exterior exposure. However, polyvinylidene fluoride has exhibited limited bonding properties with conventional primers.

One of the problem areas in the use of polyvinylidene fluoride is in the field of coil coating. The coil coating process is a high volume means of applying a wide variety of coatings to a moving strip of metal. This metal can be aluminum, cold or hot rolled steel, hot dip or electro galvanized steel or a limited variety of zinc-aluminum clad steels.

The metal is usually supplied to a coating applicator in the form of a flat "sheet" wrapped upon itself. This "sheet" can vary in length and width, typically 18 inches to 60 inches or 72 inches wide by several thousand feet in length and can weigh upwards of several thousand pounds. Conventional polyvinylidene fluoride type coil coatings are factory applied and oven fused to the properly prepared substrate. These premium finishes are typically applied to architectural building components such as metal siding, louvers, fascias, window walls, metal roofing, etc. These components are commonly post formed from the precoated coil stock. Therefore, these finishes must exhibit excellent properties of appearance and color durability, abrasion resistance and flexibility.

In order to achieve the aforementioned performance characteristics, a series of processing steps must be performed on the coil after is it received from the metal supplier.

Coiled metal is threaded into a coil coater and drawn at a high rate of speed through various stages of pretreatment, priming, and topcoating and baking until it emerges from the other end of the coil coater and it is rewound as precoated coil. This method of coating permits critical control of quality at every step in the operation. Automatic monitor equipment maintains constant conditions in cleaning and chemical baths to assure an optimum surface for applying the coating. The applicator rolls that apply the coating are accurate enough that dry film thicknesses (DFT) as low as 1/10 mil (0.0001 inches) can be deposited on the flat surface of the moving strip.

Along with providing superior quality, coil coating is highly versatile. In a single pass through the coil coating unit, a strip of metal may receive various combinations of primers and finish coats on both sides. The coating may subsequently be embossed or custom printed, creating such decorative or functional effects as wood grain patterns, trademarks or textures. A strippable film may be applied to protect the finish, or a coating of wax or other lubricant rolled on to assist in fabrication. Line speeds may be as high as 600 feet a minute but typically run on the order of 300-400 feet per minute.

In the coil coating operation, the coil is mounted on an unwinder spindle. From the unwinder spindle the strip is looped through an accumulator tower. This tower is used to provide storage of the metal strip so that the strip joiner (a device that stitches the end of one coil with the beginning of another) can operate while the line in front of the tower continues to run. After this initial "feeding" stage the actual pretreatment and coating of the metal is performed.

A pretreatment section of the coil coater simultaneously cleans both sides of the metal strip with chemical sprays and rotary brushings. In addition, a chemical conversion coating (e.g. phosphating) is applied to form a surface to promote adhesion of the primer coat. After pretreatment, the strip exits this section totally clean, dry and ready for primer application.

The clean metal strip then enters the first of two painting steps. Here the primer coat is applied to one or both sides of the strip. After the primer coats are applied, the strip is fed directly into the primer oven which quickly heats the metal and primer to the required curing temperature. Upon exiting from the primer oven, the metal strip enters the initial quench where it is cooled by a combination of air and water and then thoroughly dried. At this point the primer has become an integral bonded film ready to accept the finished coat. The surface of the strip that will be exposed to the elements will receive the topcoat while the bottom of the strip may receive a "backing"coat (i.e. an average performance finish more receptive to adhesives used with rigid foam insulation or some other type of material which would later provide rigidity to the fabricated building panel). The topcoat oven is similar to the oven used to cure the primer. It also quickly heats and cures the coated metal strip. The second and final quench cools the precoated coil to near room temperature so as to complete the basic coil coating operation.

The precoated strip then enters the exit accumulator tower, which will begin to accumulate the metal only when it becomes necessary to remove a coil from the recoiler. This action allows the coil coater to maintain its continuous operation.

Curing of these coatings is achieved by passing the strip through an oven zone with temperatures in the range of 700-900° F. Since the strip is moving at a fast rate of speed, it does not reach these temperatures but achieves what is known as peak metal temperature (PMT). This PMT is designated by the coating manufacturer as that temperature needed to cure the coating. These are typically in the range of 450°-480° F. for the polyvinylidene fluoride systems and can be achieved by a balance of line speed and oven zone temperature.

To the dried primer coating is applied the final coating which is a commercial polyvinylidene fluoride based topcoat such as Fluropon ® (DeSoto, Inc.), Duranar ® (PPG Industries) or Nubelar ® (Glidden Coatings and Resins). The polyvinylidene fluoride topcoats, when applied by coil coating techniques, have dry film thicknesses of 0.7–1.3 mils.

Following the coil coating operation, the precoated coil is fabricated and thus the cured coating laminate is subjected to a number of physical stresses which include stretch, compression, shear, shock and interruption. The results is that the coating may tend to crack or craze and there is a loss of adhesion in areas which can affect the aesthetic properties. Loss of adhesion or weak adhesion between the polyvinylidene fluoride topcoat and the substrate, particularly where a severe environment is encountered, results in a loss of physical properties and chemical resistance. Also, the application of polyvinylidene fluoride topcoatings on all substrates by spray methods utilizing conventional primer coatings has not been successful in producing a desirable product. For example, the brochure of DeSoto, Inc., 1700 S. Mt. Prospect Rd., Des Plaines, Ill., entitled "FLUROPON ® Architectural Coating" states that FLUROPON, a coating composition comprising polyvinylidene fluoride, is only approved in spray coating for use on aluminum. Surprisingly, the primer of the invention permits spray coating application on other metallic subsrates and by other methods than spray coating.

Polyvinylidene fluoride topcoats as supplied by manufacturers are based on rather strict formulation guidelines as dictated by the resin manufacturer (Pennwalt Corp., King of Prussia, Pa.). They are essentially blends of poylvinylidene fluoride resin (Kynar 500) with acrylic modifiers. They also contain pigments to produce the color requirements; and while most of these pigments do block UV, use of those that do not can lead to inconsistent performance on exposure to the elements and thus severely limits the color ranges available. These topcoats also contain blends of solvents, usually aromatic and high boiling ketones, to aid in flow and leveling and film formation. They may also contain waxes which aid the film in the fabrication steps. The manufacturers may also include proprietary "tracers" to enable coating identification once the building panels are in place. It is known to use such topcoats with the epoxy primers. However, the epoxy primers are subject to deterioration from UV which affects the topcoat physical properties and chemical resistance. The primer of the invention, because it is formulated with a large portion of inorganic materials, is not affected by UV radiation to the same degree as the epoxy primers.

One of the applications of the primer of the present invention is in connection with coil coating processes as previously described. The conventional primers currently used in coil coating processes with polyvinylidene fluoride systems are epoxy based coatings containing inhibitive pigments; for example, zinc and/or strontium chromates. The epoxies form good adhesive bonds to the substrate but are susceptible to degradation when exposed to long term UV radiation. This degradation eventually leads to intercoat adhesion loss and substrate adhesion loss. This then makes the entire system more prone to corrosive attack and thus leads to deterioration of the substrate. The susceptibility of the primer to UV comes about because of the inability of the polyvinylidene fluoride resin in the topcoat to block UV radiation even in pigmented systems.

The above illustrates the topcoating compositions which are commercially available and the generic primer compositions which are commonly utilized that provide those disadvantages over which the present invention is intended to overcome. The primer coating of the invention overcomes these disadvantages and provides additional advantages as will hereinafter be made obvious through the combination of phosphate ions and ions of the group of chromate and molybdate ions, and particulate of polyvinylidene fluoride. Among some of the advantages of the primer coating composition of the invention is its ability to withstand deterioration when subjected to UV, capability of application to a wide variety of different metallic substrates by different methods, improved physical properties and chemical resistance.

It is known that phosphate and chromate/phosphate coatings are useful to protect metal surfaces. For instance, Kirk and Othmer, Eds., *Encyclopedia of Chemical Technology*, 2nd ed. vol. 18, Interscience Publishers, a division of John Wiley & Sons, Inc., 1969 (pages 292–303), describes phosphate and chromate coatings. The United States patent literature describes coating solutions or dispersions for protective coating of metals, which compositions are suitable for use as components of the compositions of the invention. Such suitable compositions are disclosed by Allen (U.S. Pat. No. 3,248,251); Brumbaugh (U.S. Pat. No. 3,869,293); Collins (U.S. Pat. No. 3,248,249); Wydra (U.S. Pat. No. 3,857,717); Boies (U.S. Pat. No. 3,081,146); Romig (U.S. Pat. No. 2,245,609); Helwig (U.S. Pat. No. 3,967,984); Bennetch (U.S. Pat. No. 3,443,977); Hirst (U.S. Pat. No. 3,562,011) and others. These disclosures are incorporated herein by reference. Other illustrative patents or literature showing corrosion inhibiting and protective coating compositions of phosphates, mixtures of phosphates and chromates and/or molybdates are known to one skilled in the art and further examples need not be supplied. These compositions can be utilized in the present invention with or without the additives disclosed herein.

According to the present invention, there is provided a primer coating composition which causes a more effective adhesion of a polyvinylidene fluoride topcoating to different varieties of substrates and which can be applied by any of the methods of spraying, dipping, brushing, etc. The primer coating composition comprises (a) an aqueous acid coating solution comprising phosphate ions and ions of the group of chromate ions and/or molybdate ion, and (b) about 3 to about 60% by weight of particulates of polyvinylidene fluoride, preferably, 10 to 20% by weight of polyvinylidene fluoride. When the amount of polyvinylidene fluoride is below this range the beneficial effect of the presence is hardly noticed. Utilizing a larger amount is costly and causes difficulty in uniformly applying the composition.

Typically, the combination of compounds in said above-mentioned phosphate solution (a) is such as will provide at least 0.1 mole liter of dissolved phosphate (preferably 0.5 mole per liter), and at least 0.2 mole per liter of a compound from the group consisting of chromate and molybdate.

In the phosphate solution it is not necessary that a metal ion be added. When the phosphate and/or chromate or molybdate ion is furnished to the solution by addition of a metal salt, as is often done, metal ion is inherently supplied to the solution. Hence, any of the known phosphates, chromates, dichromates or molybdates can be used as the source of metal ion. Additionally, as is known, metal ion can be supplied in a form such as metal oxide, hydroxide, carbonate, etc. which will dissolve in acid, i.e. phosphoric acid, chromic acid or molybdic acid, to produce the metal phosphate, chromate or molybdate, and therefore the meal ion plus water and/or gas which is evolved. The following metal compounds will illustrate those which can be added to generate the metal ion within the solution, by an acid-base reaction, in accordance with the above: magnesium oxide; magnesium hydroxide; zinc oxide; zinc hydroxide; aluminum hydroxide; lithium oxide; lithium carbonate; and calcium hydroxide. Metal compounds which may be added to generate the metal ion in solution are various oxides, hydroxides or carbonates of magnesium, zinc, aluminum or others. Such procedures and sources for the metal ions are known and reference may be made to the cited '251 Allen patent, for instance, column 7, lines 26-57, which is incorporated herein by reference.

In the preparation of the primer coating composition, the polyvinylidene fluoride particulate can be added directly into the phosphate solution and with rapid stirring obtain a uniform mixture. However, when a coil coating composition is being prepared it is preferable that the polyvinylidene fluoride particles are first formed into an aqueous uniform dispersion by stirring so as to obtain a smooth product prior to combining with the phosphate solution. A nonionic surfactant together with a defoamer is advantageously utilized to wet the resin in forming the dispersion.

The polyvinylidene fluoride particles in the dispersion are present in an amount of about 15 to about 30% by weight of the dispersion, preferably about 20 to about 25% by weight.

For most applications, the polyvinylidene fluoride ideally has a particle size of less than 325 mesh. However, submicron particle size and particles of less than 100 mesh have been used for certain applications. As the particle size gets larger, the smoothness of the coating is affected.

In accordance with the invention, coated articles are provided which comprise a substrate, a primer coating fused thereon and a topcoat of a polyvinylidene fluoride composition. A polyvinylidene fluoride topcoat which has been found to be suitable for use over the primer composition of the invention is commercially available under the trademark FLUROPON produced by DeSoto, Inc., 1700 S. Mt. Prospect Rd., Des Moines, Ill. Likewise, the Nubelar ® and Duranar ® topcoats would also be suitable. These topcoats are solvent dispersions of polyvinylidene fluoride powder and a thermoplastic acrylic polymer. They are also known to contain a plasticizer, pigmentation and waxes for slip and abrasion resistance. The polyvinylidene fluoride particles in the commercial topcoat commonly comprises about 50 to about 95% by weight of the topcoat based on the total solids.

It has been found to be advantageous but not necessary to utilize certain additives in the primer coating compositions of the invention. Among the additives which may be added are fumed silica, colloidal silica, fumed alumina, colloidal alumina, aluminum powders, nonionic surfactants, defoamers, etc. Fumed silica can be added to the phosphate composition as a rheology modifier together with, before or after the polyvinylidene fluoride, without any significant change in the end result. The amount of the fumed silica or other additives which may be added to the chromate/phosphate composition need generally not be more than about 10%, preferably from about 0.25 to about 5% of the total solids in the coating composition.

Typical fumed silica such as Cab-0-Sil M5 used in accordance with the invention generally has the following characteristics:

| | |
|---|---|
| silica content (dry basis) % | 99.7-99.99 |
| particle size, $\mu$m | 0.007-0.05 |
| surface area, $m^2/g$ | 50-400 |
| bulk density, $lb/ft^3$ | 2.3-7 |
| loss of ignition (1000° C.) moisture free basis | 0.5-2.5 |

Generally, the fumed silica which is prepared from silicon tetrachloride by high temperature hydrolysis is about 98.8% $SiO_2$. It consists of clusters of particles, 10-40 $\mu$m in size with a surface area of 250 to 300 $m^2/g$ and a refractive index of about 1.4. The particles have a negative charge. The surface area of the products, the outside surface of the spheres and the surface itself consists of both silanol groups and siloxane groups, to have been determined to be 1 silanol group for every 30 sq. Å of surface. A preferred fumed silica (or silicon dioxide) is that available commercially under the name of Cab-O-Sil. Cab-O-Sil is described to be constituted of silica spheres averaging 7 to about 14 millimicrons. The final surface areas may range from 400 square meters per gram through 200 square meters per gram, respectively.

The coating compositions of the invention advantageously include a water-soluble, acid-stable nonionic surfactant which is capable of and does form a three dimensional, cross network with the silica which may be present in the composition. The surfactant wets the polyvinylidene fluoride so as to provide a smooth uniform mixture of the resin in a dispersion and acts as a stabilizer for the primer coating compositions. Preferably, the surfactant is an ethoxylated alkylphenol or alkylphenoxypoly(ethyleneoxy)ethanol, an ethoxylated aliphatic alcohol; polyoxyethylene, a carboxylic ester like a glycerol ester (mono or di-), a carboxylic amide like a polyoxyethylene fatty acid amide and other equivalent nonionic surfactants. Typical suitable ethoxylated alkyl phenol are alkylphenols of $C_8$-$C_{12}$ alkylphenols. If it is preferred that they be water-soluble, those having at least 60 weight percent of polyoxyethylene groups are particularly well suited. Such ethoxylated alkylphenols are well-known under various trademarks such as Igepal, Levelene, Neutronyx, Solar NP, the Surfonic series, and the Triton N and X series, just to name a few.

Amongst the polyoxyethylenes suitable for use in accordance with the invention are the mono and dialkyl ethers of ethylene glycols and their derivatives. If it is preferred that they be water-soluble, those having at least 60 weight percent of polyoxyethylene groups are particularly well suited. Typical of such nonionics are the ethylene glycol monobutyl ether, ethylene glycol monobutyl ether acetate, ethylene glycol monoethyl ether acetate, ethylene glycol dibutyl ether, ethylene glycol monohexyl ether, ethylene glycol monomethyl ether, ethylene glycol monomethyl ether acetate, ethylene glycol monophenyl ether and other equivalent ethers or ethylene glycol. Another group of nonionics particularly well suited for the preparation of the coating compositions of the invention are the polyethylene glycol and the alkoxy, particularly lower alkoxy, such as methoxy polyethylene glycol; also diethylene glycols, propylene glycol and other similar glycols.

Suitable nonionic surfactants for use in the invention are disclosed in Kirk & Othmer, *Encyclopedia of Chemical Technology*, ed. vol. 19, pages 531 to 554 entitled "Nonionic Surfactants," which is incorporated herein by reference. The nonionics used herein are stable and inert to the acidic conditions prevailing in the phosphate solution and the compositions of the invention.

It is an aspect of the invention that the nonionic surfactant be capable of and does form a three dimensional cross-linked network with the fumed silica so as to provide suspension to the finely dispersed polyvinylidene fluoride resin particles. The nonionic surfactant therefore contributes favorably to the properties of the composition. Accordingly, it is preferred that the coating compositions contain from about 0.01 to about 5% by weight and more preferably about 0.02 to 0.6% by weight of the surfactant based on total solids.

The sequence of admixing the fumed silica and the nonionic surfactant with the phosphate coating solution is not critical. Either one of these two components may be first admixed to the phosphate solution to form an intermediate liquid composition, and then the second component may be admixed to form the final primer coating composition.

If it is desired to prepare coating compositions which are especially well-suited for dip/spin, or application by dipping, the composition would contain these certain amorphous fumed silicas and a nonionic surfactant in amounts which would cause the composition to be thixotropic. Such suitable additives (and the resulting compositions) are described in copending application Ser. No. 06/441,754, filed Nov. 15, 1982, now U.S. Pat. No. 4,548,646 which is incorporated herein by reference. Likewise, the compositions of the invention may be made thixotropic by incorporation of certain aluminas as disclosed in copending application Ser. No. 06/485,748, filed Apr. 18, 1983, now U.S. Pat. No. 4,544,408 which is incorporated herein by reference.

In accordance with the invention, a particular primer coating composition has been found which is stable, i.e. it does not undergo degradation and does not classify or separate into its components, upon long storage periods (shelf stability) under conditions of use. Also, it can be applied on substrates other than aluminum by the spray method.

It is noteworthy that in accordance with the invention, a greater latitude is provided in the type of phosphate compositions which can be used. For instance, with respect to the Allen U.S. Pat. No. 3,248,251, it is not necessary that the phosphate solution be limited to the various concentrations and other molar relationships disclosed by that patent. The present invention, therefore, allows for the use of a large number of and a great variety of acidic phosphate solutions for making the primer coating compositions.

It is understood that the amount of polyvinylidene fluoride resin utilized in the primer coating composition depends on the amount of solids in the binder composition, the end use of the coating, the type of substrate and the method of applying the coating on the substrate.

It is preferred to maintain the chromate/phosphate ratio constant so as to improve formability. It is also preferable to have the metal ion concentrations low to improve curing at lower temperatures. In the composition the preferred metal ion is magnesium; however, zinc and aluminum ions can also be utilized.

The primer coating compositions of the invention are highly desirable for use in a coil coating process as well as for other methods of application and substrates.

The ingredient ranges for primer coating compositions, resin dispersion and phosphate solutions utilized in their preparation are as follows:

TABLE I

| Ingredients (g/l) | Resin Dispersion | | Phosphate Solution | | Coatings | |
| --- | --- | --- | --- | --- | --- | --- |
| | low | high | low | high | low | high |
| Mg as MgO | | | 0 | 40 | 0 | 20 |
| $Cr^{+6}$ as $CrO_3$ | | | 14 | 228 | 7 | 114 |
| $PO_4^{-3}$ as $H_3PO_4$ (85%) | | | 37 | 564 | 12.5 | 282 |
| $SiO_2$ | | | 0 | 88 | 0 | 44 |
| Defoamer | 0 | 90 | | | 0 | 45 |
| Surfactant | 0.1 | 25 | | | 0.1 | 25 |
| Polyvinylidene Fluoride | 30 | 600 | | | 30 | 600 |
| pH | 3.0 | 6.0 | 0.01 | 1.5 | 0.4 | 2.0 |

The pH of the coating compositions of the invention are preferably between 0 and 3, more preferably 0-2. At these pH ranges, rapid curing is promoted.

Before starting the treatment with the primer compositions of the present invention it is, in most cases, advisable to remove foreign matter from the metal surface to be coated by thoroughly cleaning. Cleaning may be accomplished with known agents; for instance, with agents containing sodium metasilicate, caustic soda, carbon tetrachloride, trichloroethylene, and the like, depending on the substrate to be coated. Commercial alkaline cleaning compositions which combine washing and mild abrasive treatments can be employed for cleaning, e.g. an aqueous trisodium phosphate-sodium hydroxide cleaning solution. In addition to cleaning, the substrate may undergo cleaning plus etching.

After the primer coating composition has been prepared and thoroughly mixed, it can be applied to a surface by using a spray, dip, knife, flow or roller coating technique depending upon the viscosity of the dispersion, solution or slurry. After the primer composition has been applied to a substrate by any of the above techniques, it is fused into a continuous adherent film by heating. Fusion temperatures range between about 350° F. and about 500° F., preferably between about 450° F. and about 560° F., typically 500° F. to 520° F.; and are applied for a period of from about a few seconds to about 2 hours, preferably for a period not in excess of about 1 hour. Generally, the higher the fusion temperature the shorter the residence period of the primer coating composition at that temperature. The residence period is also determined by the method employed for heating. For example, the substrate may be placed in an oven and baked for a period of hours or it may be heated at a very high temperature (about 700°-900° F.) for a few seconds until it reaches a peak metal temperature.

Subsequent applications of primer coat may be laid down in the manner stated above, allowing each layer to dry and fusing after each application. When the primer coating composition is to be used as a final coating, layers of the primer coating composition can be laid down up to thicknesses about 10 mils or higher, although coatings of more than 1 mil generally are not required.

The following examples illustrate the preparation of the coatings of the invention and are not to be considered limitations thereof.

EXAMPLE 1

A coating composition for freshly passivated hot-dipped galvanized coil (Parker Bonderite 1303) was prepared as follows:

A. A phosphate solution having the following ingredients was prepared.

| Water (deionized) | 800 ml |
| --- | --- |
| Magnesium oxide | 10 g |
| Chromic acid | 57 g |
| Phosphoric acid (85%) | 100 ml |
| Fumed silica (Cab-O-Sil M-5) | 33 g |

The ingredients were mixed and then diluted to 1 liter with deionized water.

B. A resin dispersion was prepared as follows.

| Water (deionized) | 900 ml |
| --- | --- |
| Nonionic surfactant (Triton X-100) | 2.5 ml |
| Defoamer (Colloid 677) | 1.0 ml |
| Polyvinylidene fluoride (Kynar 301-F) | 150 g |

The ingredients were admixed and then diluted to 1 liter with deionized water.

The product of Part A and resin dispersion of Part B were combined in equal volume amounts to yield the primer coating composition having a pH of 0.85-0.9 and producing a dried film thickness of 0.2-0.25 mil. A topcoat of K-500 based resin composition was applied to yield a total coated system of 1.4 mils.

The coating, while adaptable to coil application, can be fully utilized with any of the application techniques taught by U.S. Pat. No. 3,248,251 including spray, dip and flow-coat to a variety of substrates as illustrated by the following additional examples.

EXAMPLE 2

A coil coating primer composition for coil aluminum was prepared as follows:

A. Preparation of phosphate solution.

| Water (deionized) | 600 ml |
| --- | --- |
| Magnesium oxide | 20 g |
| Chromic acid | 114 g |
| Phosphoric acid (85%) | 200 ml |
| Fumed silica (Aerosil 200) | 33 g |

The ingredients were admixed and diluted to 1 liter with deionized water to form the aqueous phosphate portion of the primer.

In the preparation of the phosphate solution the fumed silica may be substituted by aluminum powder, colloidal or fumed alumina.

B. Preparation of resin dispersion.

| Water (deionized) | 900 ml |
| --- | --- |
| Polyvinylidene fluoride (Kynar 301-F) | 150 g |
| Nonionic surfactant (Igepal 630) | 2.5 ml |
| Defoamer (Troykyd 999) | 1.0 ml |

The ingredients were admixed and diluted with water to 1 liter.

The binder of part A was mixed with the dispersion of part B to produce a primer coating composition having a pH of 0.4-0.6. The composition, when applied to a substrate, has a dried film thickness of 0.2-0.25 mil.

This primer was topcoated with a K-500 based resin composition to give a laminate system of 1.0-1.2 mils total DFT.

EXAMPLE 3

A primer coating composition for aluminum extrusion was prepared with a resin dispersion of Example 2 and the following composition:

| Water (deionized) | 600 ml |
| --- | --- |
| Magnesium oxide | 20 g |
| Chromic acid | 114 g |
| Phosphoric acid (85%) | 200 ml |
| Fumed silica (Aerosil 380) | 44 g |

The ingredients were mixed, diluted to 1 liter with water and then combined with the resin dispersion to yield a primer coating composition having a pH of 0.8-1.0. The composition when applied to a substrate produces a dried film thickness of 0.4-0.6 mil. This was topcoated by spray application with a topcoat based on Kynar 202 dispersion for a DFT of 3 mils.

A suitable composition can also be obtained by adding 150 g of polyvinylidene fluoride directly into the above-mentioned composition with stirring.

EXAMPLE 4

A primer coating composition of the present invention was prepared as follows:

A. Preparation of phosphate solution.

A solution having the following ingredients was prepared:

| Water (deionized) | 600 ml |
| --- | --- |
| Magnesium oxide | 20 g |
| Chromic acid | 114 g |
| Phosphoric acid (85%) | 200 ml - dilute to 1 liter with water |
| Fumed silica (Cab-O-Sil M-5) | 33.33 g |
| Magnesium carbonate | 75 g |

Magnesium oxide and chromic acid were mixed with the water, and the phosphoric acid was then added. Dilution to 1 liter with water was made. To this mixture was added with stirring the magnesium carbonate and the fumed silica. The resulting mixture had a pH of 0.95-1.0.

B. Preparation of resin dispersion.

A dispersion of polyvinylidene fluoride powder was prepared as follows:

| Polyvinylidene fluoride (Kynar ES) | 45 g |
| --- | --- |
| Carbitol acetate | 34 ml |
| Water (deionized) | 240 ml |
| Silicone defoamer (Dapro DF1181) | 10 ml |
| Surfactant (Pluronic L-61) | 6 g |
| Surfactant (Pluronic F-108) | 6 g |
| Non-silicone defoamer (Dapro 944) | 30 ml |

The polyvinylidene fluoride powder was premixed with the carbitol acetate and the mixture was added to a combination of the water, surfactants and defoaming agents. The entire mixture was then ball milled for four hours. The resulting mixture had a pH of 5.45.

The resin dispersion was then added to the solution of part A in a 2:1 volume ratio to give a primer coating composition with a pH of 1.68. The primer was applied to aluminum castings and topcoated with Kynar 202 dispersion to total film build of 4 mils.

EXAMPLE 5

Following the procedure of Example 1, but modifying the solution of Part A, produced another coating composition suitable for use on a hot-dipped galvanized substrate (Heatbath Galv-Brite 1121) as follows:

| | |
|---|---|
| Water (deionized) | 800 ml |
| Magnesium oxide | 5 g |
| Chromic acid | 28.5 g |
| Phosphoric acid | 50 ml |
| Fumed silica (Aerosil 300) | 33 g |

The mixture was combined and diluted with deionized water to 1 liter. When combined with the resin dispersion the composition has a pH of 1.1–1.2 and produces a dried film thickness of 0.4–0.6 mil. The primer was topcoated by spray application of Kynar 500 based composition to DFT of 2 mils.

EXAMPLE 6

A primer composition for powder metal steel parts was prepared as follows:
A. Preparation of phosphate solution.

| | |
|---|---|
| Water (deionized) | 600 ml |
| Zinc carbonate | 47 g |
| Chromic acid | 57 g |
| Phosphoric acid | 100 ml |
| Fumed silica (Cab-O-Sil M-5) | 33 g |

The ingredients were admixed and the mixture was diluted to one liter with water.
B. Preparation of resin dispersion.

| | |
|---|---|
| Polyvinylidene fluoride (Kynar 520) | 150 g |
| Water (deionized) | 900 ml |
| Nonionic surfactant (Triton X-100) | 2.5 ml |
| Defoamer (Colloid 677) | 1.0 ml |

The ingredients were admixed and diluted to 1 liter with water.

The solution of Part A was mixed with an equal volume of the dispersion of Part B to yield a primer coating composition having a pH of 1.1–1.3, a dried film thickness of 0.4–0.6 mil.

The curing of the coating may be 15 minutes at 560° F.±10° F. to peak metal temperature of 500° F., then topcoated with Kynar 202 dispersion composition.

A suitable primer composition can also be obtained by adding 150 g of polyvinylidene fluoride directly into the phosphate solution without first preparing a dispersion.

EXAMPLE 7

Following the procedure of Example 6, a primer composition for steel parts was prepared as follows:
A. Preparation of phosphate solution.

| | |
|---|---|
| Water (deionized) | 600 ml |
| Zinc carbonate | 47 g |
| Chromic acid | 57 g |
| Phosphoric acid | 100 ml |

The ingredients were admixed and the mixture was diluted to one liter with water.
B. Preparation of resin dispersion.

| | |
|---|---|
| Polyvinylidene fluoride (Kynar 301F) | 150 g |
| Water (deionized) | 900 ml |
| Nonionic surfactant (Triton X-100) | 2.5 ml |
| Defoamer (Dapro 944) | 1.0 ml |

The ingredients were admixed and diluted to one liter with water.

The solution of Part A was mixed with an equal volume of the dispersion of Part B to yield a primer coating composition suitable for steel parts, topcoated with Liquinite PVF$_2$ powder coating to a DFT of 5 mils.

EXAMPLE 8

A primer composition for zinc die cast parts was prepared as follows:
A. Preparation of phosphate solution.

| | |
|---|---|
| Water (deionized) | 800 ml |
| Magnesium oxide | 10 g |
| Chromic acid | 57 g |
| Phosphoric acid (85%) | 100 ml |
| Fumed silica (Cab-O-Sil M-5) | 33 g |

B. Preparation of primer composition.

| | |
|---|---|
| Phosphate solution | 1000 ml |
| Polyvinylidene fluoride (Kynar 301F) | 300 gm |
| Nonionic surfactant (Triton X-100) | 5 gm |

The ingredients in B were admixed to yield a composition with pH of 0.85–0.9. This composition was applied to zinc die cast parts to yield a cured primer film of 0.4–0.6 mil DFT. Parts were topcoated with K-500 based composition to DFT of 2 mils.

EXAMPLE 9

A primer coating composition of the present invention was prepared as follows:
A. Preparation of phosphate solution.
A solution having the following ingredients was prepared:

| | |
|---|---|
| Water (deionized) | 600 ml |
| Magnesium oxide | 20 g |
| Chromic acid | 114 g |
| Phosphoric acid (85%) | 200 ml - dilute to 1 liter with water |
| Fumed silica | 33.33 g |
| Magnesium carbonate | 75 g |

Magnesium oxide and chromic acid were mixed with the water, and the phosphoric acid was then added. Dilution to 1 liter with water was made. To this mixture was added with stirring the magnesium carbonate and the fumed silica. The resulting mixture had a pH of 0.95–1.0.

B. A 10% alumina dispersion was prepared as follows.

| | |
|---|---|
| Water (deionized) | 447 ml |
| Conc. nitric acid | 42 g |

| | |
|---|---|
| -continued | |
| Dispersible alumina | 45 g |

The ingredients were admixed with rapid stirring until a smooth mixture was obtained.

C. Preparation of primer compositions.

1. To 520 g of the product of Part A is added 428 g of the dispersion of Part B.

2. For each 100 ml of the combined product of Parts A and B is added 60 ml of polyvinylidene fluoride latex (Kynar 32), wherein the polyvinylidene fluoride has an average particle size which is submicron, to obtain a primmer composition according to the invention.

EXAMPLE 10

A primer composition suitable for dip/spin application to electroplated zinc and/or cadmium fasteners and small parts was prepared using the phosphate solution of Example 1. The final composition is:

| | |
|---|---|
| A. Phosphate solution (example 1) | 100 ml |
| B. Polyvinylidene fluoride latex (K-32 latex Pennwalt) | 100 ml |

The two items are admixed to give a primer suitable for dip/spin use on plated fasteners and small parts. Parts were topcoated with a composition based on Kynar 500 resin suitable for exposure to salt spray and moist $SO_2$ environments.

COMPARATIVE TEST

The following comparative test was performed on cured laminates which were prepared on HDG substrate with the primer composition of Example 1, a commercially available epoxy primer and a sample which contained no primer. The topcoating consisted of commercial polyvinylidene fluoride topcoat based on Kynar 500 resin.

| | Results | | |
|---|---|---|---|
| Test | Primer of Example 1 | Epoxy Primer | No Primer |
| Crosshatch Adhesion (ASTM D3359 Method B) | Pass | Pass | Pass |
| Impact (ASTM D2794) | | | |
| Std | 160$^{in}$/lbs | 160$^{in}$/lbs | 160$^{in}$/lbs |
| Reverse | 160$^{in}$/lbs | 160$^{in}$/lbs | 160$^{in}$/lbs |
| T-Bend | 0–1T | 1T–2T | 0–1T |
| Conical Mandrel (ASTM D522) | ⅛" pass | ⅛" pass | ⅛" pass |
| Salt Spray (ASTM B117) | 750 hrs. | 750 hrs. | 120 hrs. |
| Scribe | 10 clean | 4–7 pickoff | 4–6 pickoff |
| Field | 9 | 8–10 | 8 pickoff |
| Edge | 10 | 9 | 4–5 |

Numerical ratings for salt spray per D1654.

The primer of Example 1 showed the best performance over the epoxy primer and no primer in the Salt Spray Test. The Scribe Test was indicative of the damage which would result to the topcoat in an outdoor environment. The Field Test is significant as to the integrity of the applied system. The Edge Test illustrated the condition of sheared edges of a side of precoated sheet under adverse conditions. The major and most significant test in the group was the Scribe Test, in which the primer of the invention showed a definite advantage.

We claim:

1. A metal part coated with a heat cured primer coating especially suitable for a topcoat of polyvinylidene fluoride, which primer is from an aqueous acidic solution of phosphate ions and ions of the group chromate and molybdate which solution has a pH in the range of about 0 to about 3, and in dispersion therein, particles of polyvinylidene fluoride, said primer coating providing improved bonding and adhesion to the substrate and improved bonding for the polyvinylidene topcoat.

2. The primer coated metal part of claim 1 to which there is integrally bonded a cured topcoat which comprises polyvinylidene fluoride, and which part has improved resistance to deterioration from UV light.

3. The coated metal part of claim 1 wherein the pH of the solution is about 0 to about 2.

4. The coated metal part of claim 3 wherein the amount of polyvinylidene fluoride particles is from about 10 to 20% by weight.

5. The coated metal part of claim 4 wherein the particles of polyvinylidene fluoride are in an amount of about 15 to about 30% by weight.

6. The coated metal part of claim 1 wherein the primer is in direct bonding contact with the substrate.

7. The coated metal part of claim 6 wherein the primer is integrally fused onto the substrate.

8. The coated metal part of claim 1 wherein the coating has a dry film thickness of about 0.10 mil.

9. The coated metal part of claim 1 wherein the solution contains at least 0.1 mole of dissolved phosphate and at least 0.2 mole of molybdate or chromate ions.

10. The coated metal part of claim 1 wherein the ions in the solution in addition to the phosphate ions, are chromate ions.

11. The coated metal part of claim 1 wherein the ions in the solution in addition to the phosphate ions, are molybdate ions.

12. The coated metal part of claim 1 which comprises several layers of primer coating.

13. The coated metal part of claim 1 wherein the solution is free of ammonium hydroxide.

14. The coated metal part of claim 1 in which the primer is thixotropic.

15. The coated metal part of claim 1 wherein the metal part coated is selected from the groups consisting of aluminum, zinc and cadmium.

16. The coated metal part of claim 1 wherein the metal part coated is a metal-plated part.

17. The coated metal part of claim 16 wherein the metal part coated is a zinc-plated or cadmium-plated part.

18. The coated metal part of claim 15 wherein the metal part coated is a zinc die cast part.

19. The coated metal part of claim 14 wherein the metal part coated is a fastener.

20. The coated metal part of claim 1 wherein the metal is selected from the group consisting of aluminum, cold or hot-rolled steel, hot-dipped or electro-galvanized steel and zinc-aluminum clad-steel.

21. The coated metal part of claim 1 which is a sheet coil.

22. The primer coated metal part of claim 2 in which the primer is thixotropic.

23. The primer coated metal part of claim 2 wherein the topcoat also includes a thermoplastic acrylic polymer.

24. The primer coated metal part of claim 23 wherein the balance of the topcoat in addition to the thermoplastic acrylic polymer, is constituted of polyvinylidene fluoride in the amount of about 50 to about 95% by weight of the topcoat.

25. The primer coated metal part of claim 2 wherein the topcoat has a dry film thickness of about 0.7 to about 1.3 mils.

26. The primer coated metal part of claim 2 wherein the primed metal part coated is selected from the group consisting of aluminum, zinc and cadmium.

27. The primer coated metal part of claim 2 wherein the primed metal part coated is a metal-plated part.

28. The primer coated metal part of claim 26 wherein the primed metal part coated is a zinc-plated or cadmium-plated part.

29. The primer coated metal part of claim 22 wherein the primed metal part coated is a fastener.

30. The primer coated metal part of claim 2 wherein the primed metal coated is a zinc die cast part.

31. The primer coated metal part of claim 2 wherein the primed metal coated is selected from the group consisting of aluminum, cold or hot-rolled steel, hot-dipped or electro-galvanized steel and zinc-aluminum clad steel.

32. The primer coated metal part of claim 2 which is a steel coil.

* * * * *